(12) United States Patent
Tribak Lyedri et al.

(10) Patent No.: US 10,558,980 B2
(45) Date of Patent: Feb. 11, 2020

(54) ONLINE TRANSACTION PROCESSING SYSTEM FOR TRANSACTIONS INCLUDING MULTIPLE PRODUCT SUPPLIERS

(71) Applicant: Amadeus S.A.S., Biot (FR)

(72) Inventors: Ahmed Taha Tribak Lyedri, Antibes (FR); Simon Cognet, Antibes (FR); Julien Hugol, Biot (FR); Arnaud Schwartz, Nice (FR); Pierre Cabeza, Sophia Antipolis (FR)

(73) Assignee: AMADEUS S.A.S., Biot (FR)

( * ) Notice: Subject to any disclaimer, the term of this patent is extended or adjusted under 35 U.S.C. 154(b) by 677 days.

(21) Appl. No.: 15/054,286

(22) Filed: Feb. 26, 2016

(65) Prior Publication Data

US 2017/0249637 A1 Aug. 31, 2017

(51) Int. Cl.
*G06Q 30/00* (2012.01)
*G06Q 20/40* (2012.01)
*G06Q 30/06* (2012.01)
*G06Q 20/12* (2012.01)

(52) U.S. Cl.
CPC .......... *G06Q 20/407* (2013.01); *G06Q 20/12* (2013.01); *G06Q 30/0613* (2013.01)

(58) Field of Classification Search
CPC .................................................... G06Q 30/00
See application file for complete search history.

(56) References Cited

U.S. PATENT DOCUMENTS

| 5,496,991 A | 3/1996 | Delfer, III et al. |
| 6,023,679 A | 2/2000 | Acebo et al. |
| 7,103,566 B2 * | 9/2006 | Silva ............... G06Q 30/06 705/26.8 |
| 8,892,468 B1 | 11/2014 | Litle |
| 9,692,738 B1 * | 6/2017 | Wenneman ......... H04L 63/08 |
| 2001/0007099 A1 * | 7/2001 | Rau ................. G06Q 30/02 705/26.8 |

(Continued)

FOREIGN PATENT DOCUMENTS

WO   WO2017010936   *  1/2017   ............. G06Q 20/32

OTHER PUBLICATIONS

Amadeus Corp 1, Electronic Miscellaneous Document, dated May 2012, 28 pages. (Year: 2012).*

(Continued)

*Primary Examiner* — Mark A Fadok
(74) *Attorney, Agent, or Firm* — Thompson Hine LLP

(57) ABSTRACT

Systems, methods, and computer program products for an On-Line Transaction Processing (OLTP) system. Payment and merchant information is stored in a database record for each product in a set of products from multiple suppliers. In response to receiving a request to refund products in the set, the OLTP system may determine the merchant, a number of payments, and the amount of each payment for each product being refunded based on the payment and merchant information in the database record, and trigger payments between the supplier, seller, and buyer. In response to detecting an error, the OLTP system may store a status of the refund processing in the database record and queue the transaction for processing by a call center. In response to receiving a restart request, the OLTP system may retrieve the status data from the database record and restart processing of the refund based on the status data.

21 Claims, 8 Drawing Sheets

(56) References Cited

U.S. PATENT DOCUMENTS

| | | | |
|---|---|---|---|
| 2001/0034658 A1* | 10/2001 | Silva | G06Q 30/06 705/26.8 |
| 2003/0225625 A1* | 12/2003 | Chew | G06Q 20/209 705/24 |
| 2005/0125262 A1* | 6/2005 | Bartning | G06Q 10/02 705/5 |
| 2005/0256750 A1* | 11/2005 | Hand | G06Q 10/06 705/5 |
| 2008/0041945 A1* | 2/2008 | Williamson | G06Q 30/06 235/384 |
| 2008/0093448 A1* | 4/2008 | de la Huerga | G06F 19/3462 235/385 |
| 2008/0208703 A1* | 8/2008 | Kim | G06Q 30/02 705/26.1 |
| 2008/0294469 A1* | 11/2008 | Caballero | G06Q 10/02 705/5 |
| 2010/0121771 A1* | 5/2010 | Schultz | G06Q 10/0837 705/340 |
| 2010/0262521 A1* | 10/2010 | Robinson | G06Q 10/08 705/29 |
| 2012/0209640 A1* | 8/2012 | Hamper | G06Q 40/12 705/5 |
| 2012/0226620 A1* | 9/2012 | Junger | G06Q 10/0833 705/304 |
| 2012/0239442 A1* | 9/2012 | Mortagne | G06Q 10/02 705/6 |
| 2013/0346123 A1 | 12/2013 | Pelissier et al. | |
| 2014/0156443 A1* | 6/2014 | Wesche | G06Q 30/0611 705/26.4 |
| 2014/0156466 A1* | 6/2014 | Westphal | G06Q 30/0635 705/26.81 |
| 2014/0250122 A1* | 9/2014 | Fredericks | G06Q 10/02 707/736 |
| 2015/0058185 A1* | 2/2015 | Hamper | G06Q 40/12 705/30 |
| 2015/0134488 A1* | 5/2015 | MacLaurin | G06Q 30/0639 705/26.62 |
| 2015/0161689 A1* | 6/2015 | Collendavelloo | G06Q 30/04 705/13 |
| 2015/0242834 A1* | 8/2015 | Goldsmith | G06Q 20/22 705/39 |
| 2017/0372433 A9* | 12/2017 | Hamper | G06Q 40/12 |

OTHER PUBLICATIONS

Amadeus Corp 2, Electronic Miscellaneous Document, User Guide, dated Dec. 2011, 177 pages. (Year: 2011).*

Priceline.com, "Priceline.com Includes Potential Hurricane Season Destinations in New Sunshine Guaranteed Vacation Packages Promotion for Fall 2008", Business Wire, dated Aug. 4, 2008. (Year: 2008).*

* cited by examiner ns and a memory coupled to the processors. The memory stores program code that, when executed by the one or more processors, causes the system to receive a refund request identifying a database record that defines an itinerary, a first product in the itinerary to be refunded, and a second product in the itinerary to be refunded. The program code further causes the system to retrieve, from the database record, data defining a merchant for the first product as a supplier of the first product, a first payment made by a buyer to the merchant for the first product, a seller as the merchant for the second product, and a second payment made by the buyer to the merchant for the second product. The program code may then cause the system to determine, based on the first data, a first amount to be refunded to the buyer from the seller, a second amount to be refunded to the buyer from the supplier of the first product, and a third amount to be refunded to the seller from the supplier of the second product.

ONLINE TRANSACTION PROCESSING SYSTEM FOR TRANSACTIONS INCLUDING MULTIPLE PRODUCT SUPPLIERS

BACKGROUND

The invention generally relates to computers and computer systems and, in particular, to methods, systems, and computer program products that process online transactions involving a set of products including more than one product supplier.

Modern electronic commerce typically involves the sharing and processing of data across multiple computing systems interconnected by a network. In this environment, transactions for a set of products that involve multiple product suppliers may result in complex interactions between supplier and seller systems to insure that each product is concurrently priced and available. Systems on the buyer side may also contribute to this complexity by providing multiple forms of payment, each of which may require data processing by one or more bank, payment, or secure transaction computer systems. To support increasingly large input data sets and associated data manipulation tasks, which may be distributed across multiple computing systems, On-Line Transaction Processing (OLTP) systems require sophisticated transaction management processes. These processes may manage communication between buyer, seller, supplier, and payment systems, and may employ database optimization techniques to enable processing of large numbers of transactions while providing high availability, speed, concurrency, and recoverability of the online transactions.

Transactions involving a retailer or other indirect seller may be structured in different ways. One way the transaction may be structured is to have the supplier paid using a form of payment provided by the buyer, e.g., a credit card. In this case the supplier may be considered the merchant for the sale of the products, and the seller may receive a commission or service fee from the supplier. Another way the transaction may be structured is to collect payment from the buyer using the form of payment provided by the buyer, and use another form of payment pay the supplier. In this case the seller may be considered the merchant for the products. Being the merchant may enable the seller to control markups and/or discounts on the product, but may also result in the seller being accountable for the payment transactions, so that the seller bears the risk of the transaction being fraudulent. Thus, the seller may want to be the merchant for some products, but not others.

Conventional OLTP systems may have difficulty processing a transaction for the purchase of multiple products structured so that the merchant for one of the products is the seller and the merchant for another of the products is the supplier. For example, attempting to assign different merchants to different products at the time of sale may cause errors in processing the initial transaction, as well as problems rolling back payments if the buyer later requests a refund. Thus, existing OLTP systems may limit how transactions to purchase multiple products can be structured.

Thus, improved systems, methods, and computer program products for OLTP systems are needed that provide increased flexibility in structuring transactions involving the purchase of multiple products.

SUMMARY

In an embodiment of the invention, an online transaction processing system is provided that includes one or more In another embodiment of the invention, a method of processing the refund request is provided. The method includes receiving the refund request at the online transaction processing system, the refund request identifying the database record that defines the itinerary, the first product in the itinerary to be refunded, and the second product in the itinerary to be refunded. The method retrieves, from the database record, data defining the merchant for the first product as the supplier of the first product, the first payment made by the buyer to the merchant for the first product, the seller as the merchant for the second product, and the second payment made by the buyer to the merchant for the second product. The method may then determine, based on the data, the first amount to be refunded to the buyer by the seller, the second amount to be refunded from the supplier of the first product to the buyer, and the third amount to be refunded by the supplier of the second product to the seller.

In another embodiment of the invention, a computer program product is provided that includes a non-transitory computer-readable storage medium including program code. The program code is configured, when executed by the one or more processors, to cause the one or more processors to receive the refund request identifying the database record that defines the itinerary, the first product in the itinerary to be refunded, and the second product in the itinerary to be refunded. The program code further causes the processors to retrieve, from the database record, the data defining the merchant for the first product as the supplier of the first product, the first payment made by the buyer to the merchant for the first product, the seller as the merchant for the second product, and the second payment made by the buyer to the merchant for the second product. The program code may then cause the processors to determine, based on the first data, the first amount to be refunded to the buyer from the seller, the second amount to be refunded to the buyer from the supplier of the first product, and the third amount to be refunded to the seller from the supplier of the second product.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to systems, methods, and computer program products for managing online transactions involving the purchase of multiple products, such as a set of travel related products comprising an itinerary for a trip. Embodiments of the invention may be implemented by an On-Line Transaction Processing (OLTP) system comprising one or more networked computers or servers. The OLTP system may be configured to handle a complex itinerary that includes heterogeneous products, such as flights, hotels, cars, cruises, attractions, and travel insurance products from multiple suppliers of different types. The itinerary may be defined in a database record, or travel record, that provides a centralized storage location for data relating to processing of the online transaction.

To enable the use of different payment structures for each of the products in the itinerary, embodiments of the invention may include a transaction server that processes transactions to purchase and refund itineraries having products that were paid for using different payment structures. The transaction server may maintain a transaction database that stores database records, or transaction records, which track payment structures for itineraries that include products for which the seller is the merchant, and products for which the supplier is the merchant. The transaction database may enable the transaction server to trigger refunds to the buyer from the supplier side or from the seller side depending on the identity of the merchant for the product in question.

Processing of refunds from the supplier side may include cancellation of product booking and/or contract issuance, as well as triggering payments from the supplier to the buyer. Processing of refunds from the seller side may include triggering payments from the seller to the buyer. In either case, refund transactions may be initiated by the transaction server in response to receiving a request to refund the itinerary. In cases where a refund transaction is initiated by the seller, the transaction server may handle refunds on both the supplier side and the seller side on all selected products, and refund payments on the seller side may be aggregated in a single transaction to a payment system.

If an error message is received during the refund process, the transaction server may store the status of the transaction (e.g., a refund status of each product) in the transaction record, queue the travel record for further processing, and notify the seller of the error. Once the error has been resolved, the transaction server may restart processing of the refund by querying the transaction record for the status of the transaction.

Figure 1:
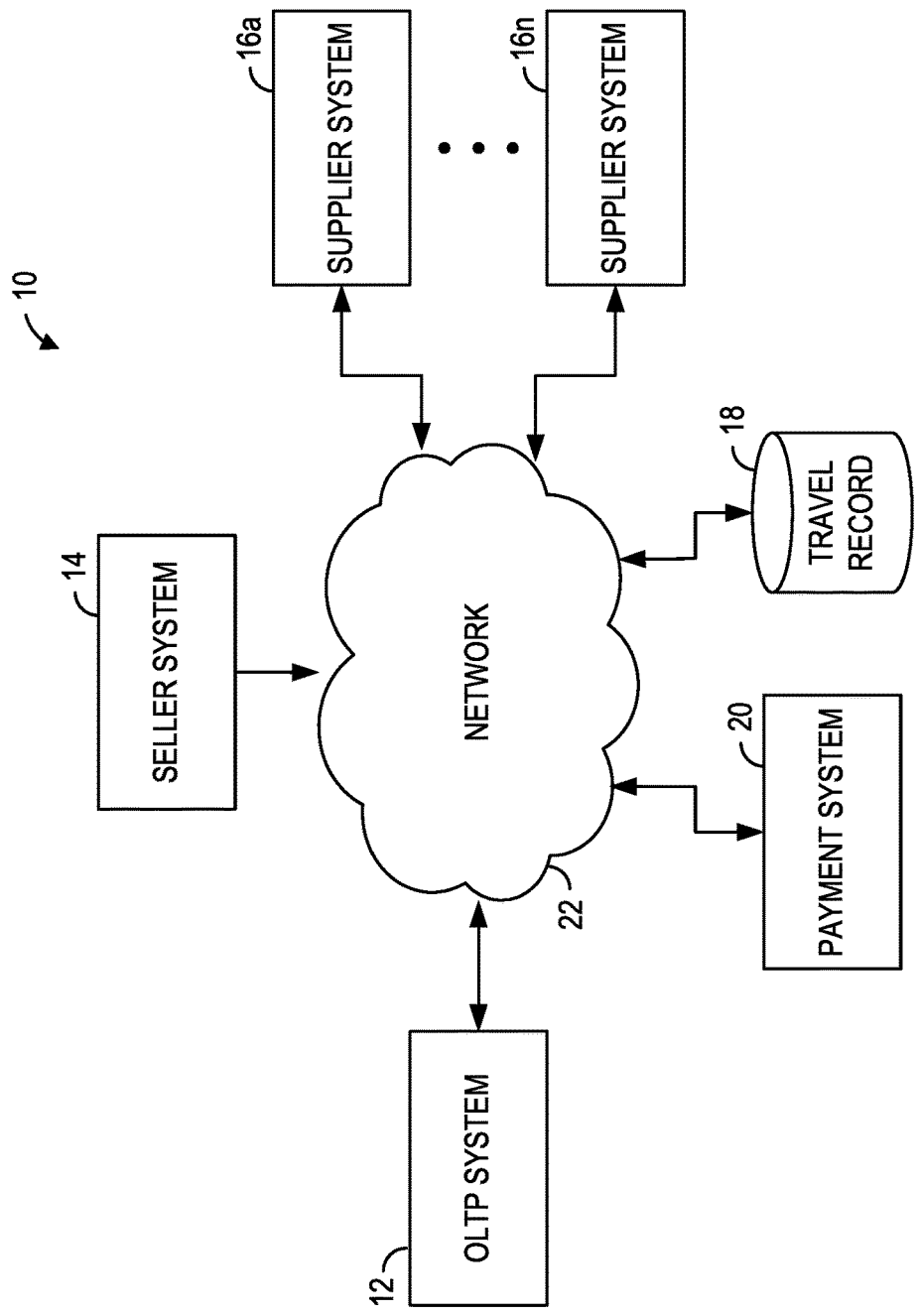
FIG. 1 is a diagrammatic view of an exemplary operating environment including an online transaction processing system in communication with a seller system, one or more supplier systems, a travel record database, and a payment system.

Referring now to FIG. 1, an operating environment 10 in accordance with an embodiment of the invention may include an OLTP system 12, a seller system 14, one or more supplier systems 16a-16n, a travel record database 18, and a payment system 20. Each of the OLTP system 12, seller system 14, supplier systems 16a-16n, travel record database 18, and payment system 20 may communicate through a network 22. The network 22 may include one or more private or public networks (e.g., the Internet) that enable the exchange of data between systems connected to the network 22.

The OLTP system 12 may be configured to process online transactions to purchase a set of products. The set of products may include products from one or more suppliers and/or providers of products, such as an air or rail carrier, a hotel, car rental company, cruise company, or other supplier or provider of travel products. A supplier may be an entity that invoices and receives payment for the product, and a provider may be an entity that delivers the product. In some cases, the supplier and the provider may be the same entity, in which case the terms supplier and provider may be used interchangeably. This would be the case, for example, when a carrier provides a seat for a flight, and invoices the buyer for booking the seat. The buyer may pay the seller for a product in cases where the seller is the merchant, or pay the supplier for the product cases where the supplier is the merchant.

Each set of products may comprise, for example, an itinerary for a trip sold by an indirect seller of the products, such as a travel agency. In an embodiment of the invention, the OLTP system 12 may include or be part of a Global Distribution System (GDS) configured to facilitate communication between the seller system 14 and the supplier systems 16a-16n. The GDS may enable travel agents, validating carriers, or other indirect sellers to book reservations on the supplier systems 16a-16n via the GDS. The GDS may maintain links to the supplier systems 16a-16n via the network 22 that enables the GDS to route reservation requests from the indirect seller to a corresponding supplier of the product being reserved. The seller system 14 may thereby book travel products from multiple suppliers via a single connection to the GDS. The supplier systems 16a-16n may include a Computer Reservation System (CRS) that enables the OLTP system 12 to reserve and book travel products. The supplier systems 16a-16n may also interact with other supplier systems 16a-16n.

In response to the traveler reserving a product, the OLTP system 12 may store data in the travel record database 18 that identifies the reserved product. This data may be maintained in a travel record that includes one or more data fields which contain product, traveler, and other information associated with one or more reserved products in the itinerary. Each travel record in the travel record database 18 may include data defining the itinerary for a particular trip, traveler, or group of travelers. The defined itinerary may include travel products from multiple suppliers and/or providers of travel products. To facilitate locating the travel record in the travel record database 18, a record locator or other suitable identifier may be associated with the travel record. The travel record database 18 may be provided as a stand-alone system, or may be part of another system, such as a CRS or GDS.

The payment system 20 may be configured to process forms of payment related to the purchase of products by the buyer. The payment system 20 may include, or be configured to exchange data with, one or more bank systems, such as an issuing bank system and/or an acquiring bank system, to authorize payment and transfer funds between accounts. In the case of a purchase paid for at least in part by a credit or debit card, at the time of the transaction, the payment system 20 may transmit an authorization request to the issuing bank system, which may be determined from the issuer identification number of the card. In response to receiving the authorization request, the issuing bank system may verify the account is valid, and that the account has sufficient funds to cover the amount of the transaction. The issuing bank system may then transmit an authorization response to the payment system 20 indicating that the transaction has been approved, declined, or that more information is required.

The process of booking a reserved itinerary may include checking a corresponding supplier system 16a-16n for availability of the products identified by the reserved itinerary, e.g., seat availability on a flight, room vacancies in a hotel, etc. This check may include sending a reservation request from the OLTP system 12 to the supplier system. If the requested products are available, the products may be booked, a booking confirmation transmitted to the OLTP system 12, and the inventory adjusted in an inventory database to reflect the booking. In response to the traveler approving the transaction, payment may be made from the buyer to the merchant by billing the account of the buyer for the price of the services. In response to receiving payment, the booking may be confirmed by the supplier system.

Figure 2:
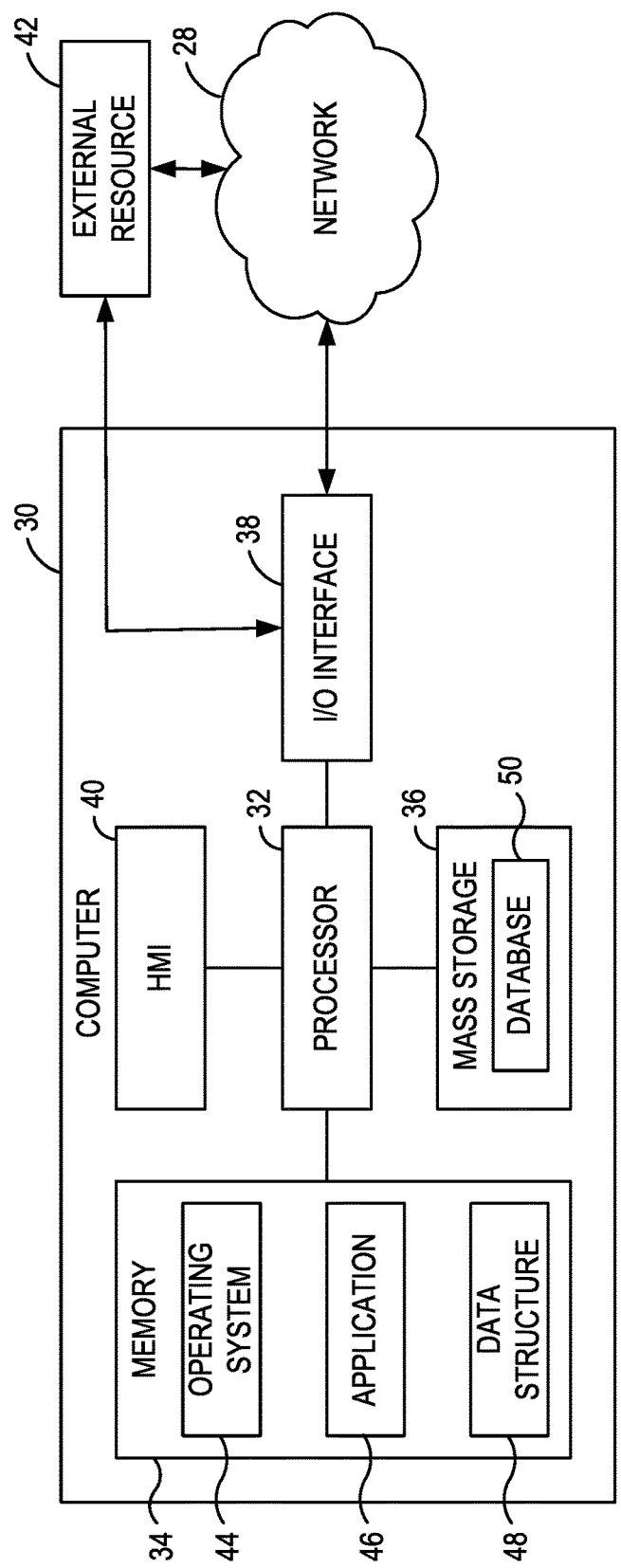
FIG. 2 is a diagrammatic view of an exemplary computer that may be used to provide the operating environment of FIG. 1.

Referring now to FIG. 2, the OLTP system 12, seller system 14, supplier systems 16a-16n, travel record database 18, payment system 20, and network 22 of operating environment 10 may be implemented on one or more computer devices or systems, such as exemplary computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 22 or I/O interface 38. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, volatile or non-volatile solid state device, or any other device capable of storing data.

The processor 32 may operate under the control of an operating system 44 that resides in memory 34. The operating system 44 may manage computer resources so that computer program code embodied as one or more computer software applications, such as an application 46 residing in memory 34, may have instructions executed by the processor 32. The processor 32 may also execute the application 46 directly, in which case the operating system 44 may be omitted. The one or more computer software applications may include a running instance of an application comprising a server, which may accept requests from, and provide responses to, one or more corresponding client applications. One or more data structures 48 may also reside in memory 34, and may be used by the processor 32, operating system 44, and/or application 46 to store and/or manipulate data.

The I/O interface 38 may provide a machine interface that operatively couples the processor 32 to other devices and systems, such as the network 22 or external resource 42. The application 46 may thereby work cooperatively with the network 22 or external resource 42 by communicating via the I/O interface 38 to provide the various features, functions, applications, processes, or modules comprising embodiments of the invention. The application 46 may also have program code that is executed by one or more external resources 42, or otherwise rely on functions or signals provided by other system or network components external to the computer 30. Indeed, given the nearly endless hardware and software configurations possible, it should be understood that embodiments of the invention may include applications that are located externally to the computer 30, distributed among multiple computers or other external resources 42, or provided by computing resources (hardware and software) that are provided as a service over the network 22, such as a cloud computing service.

The HMI 40 may be operatively coupled to the processor 32 of computer 30 to enable a user to interact directly with the computer 30. The HMI 40 may include video or alphanumeric displays, a touch screen, a speaker, and/or any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

A database 50 may reside on the mass storage memory device 36, and may be used to collect and organize data used by the various systems and modules described herein. The database 50 may include data and supporting data structures that store and organize the data. In particular, the database 50 may be arranged with any database organization or structure including, but not limited to, a relational database, a hierarchical database, a network database, an object-oriented database, or combinations thereof.

A database management system in the form of a computer software application executing as instructions on the processor 32 may be used to access data stored in records of the database 50 in response to a query, where the query may be dynamically determined and executed by the operating system 44, other applications 46, or one or more modules. Although embodiments of the invention may be described herein using relational, hierarchical, network, object-oriented, or other database terminology in specific instances, it should be understood that embodiments of the invention may use any suitable database management model, and are not limited to any particular type of database.

Figure 3:
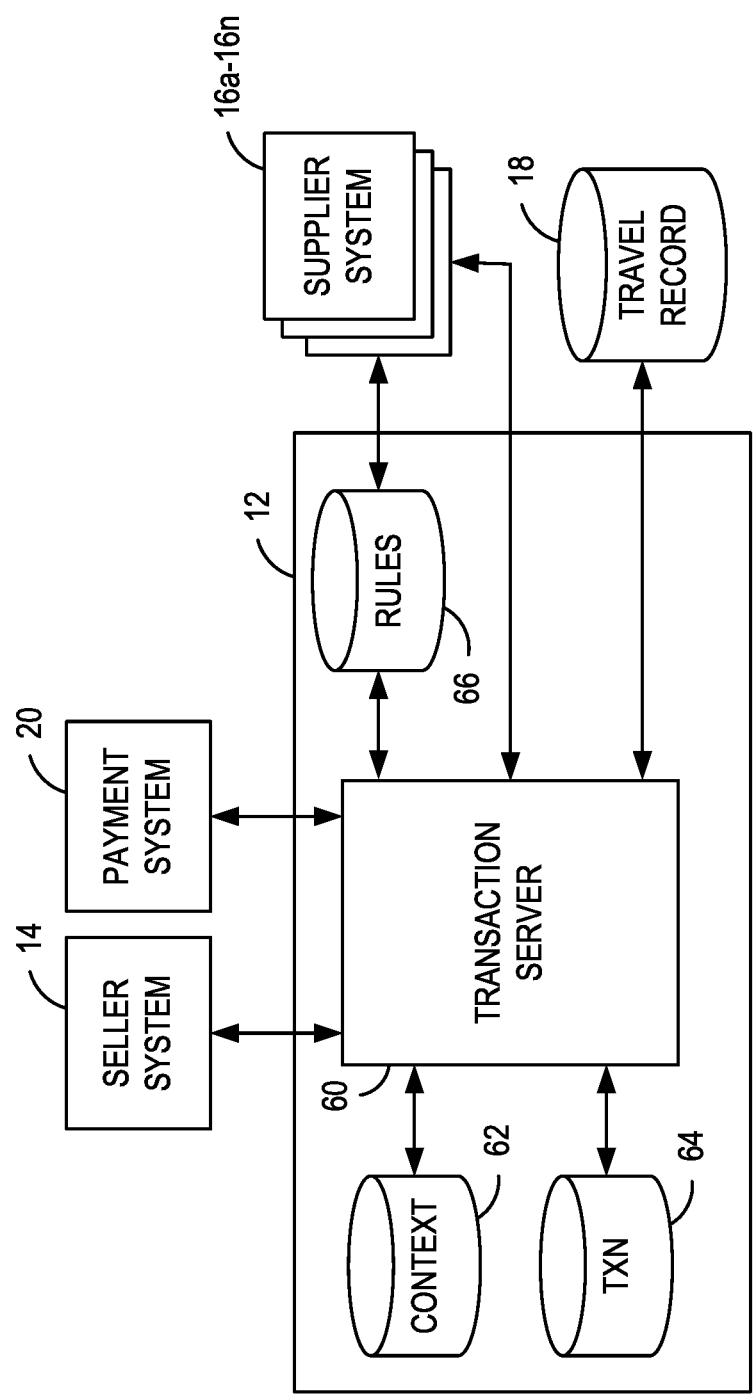
FIG. 3 is a diagrammatic view of the online transaction processing system depicting a transaction server, a context database, a transaction database, and a rules database.

Referring now to FIG. 3, the OLTP system 12 may include a transaction server 60, a context database 62, a transaction database 64, and a rules database 66. The transaction server 60 may communicate with other systems, such as the seller system 14, supplier systems 16a-16n, travel record database 18, and/or payment system 20. The context database 62 may store contextual information for each transaction handled by the transaction server 60 in a corresponding transaction context record. The contextual information in the context database 62 may enable continuity to be maintained for a buyer using multiple channels, such as a web-site and a call center, to request a refund and/or resolve an issue with a transaction. Transaction level information stored in the transaction record may include a record identifier for the corresponding travel record in the travel record database 18, time-stamp data, and service fee data. Product level data may include, for each product in the itinerary, the type of product (hotel room, rental car, flight, etc.), the provider of the product (e.g., the identity of the company or franchise providing the product), the identity of the merchant (e.g., the identity of the seller or the supplier of the product), the current state of the product (pending removal, removal complete, error encountered, etc.) a type of error (e.g., conditional), payment details, booking amount, penalty amounts, fare used, and/or amount refundable.

Figure 4:
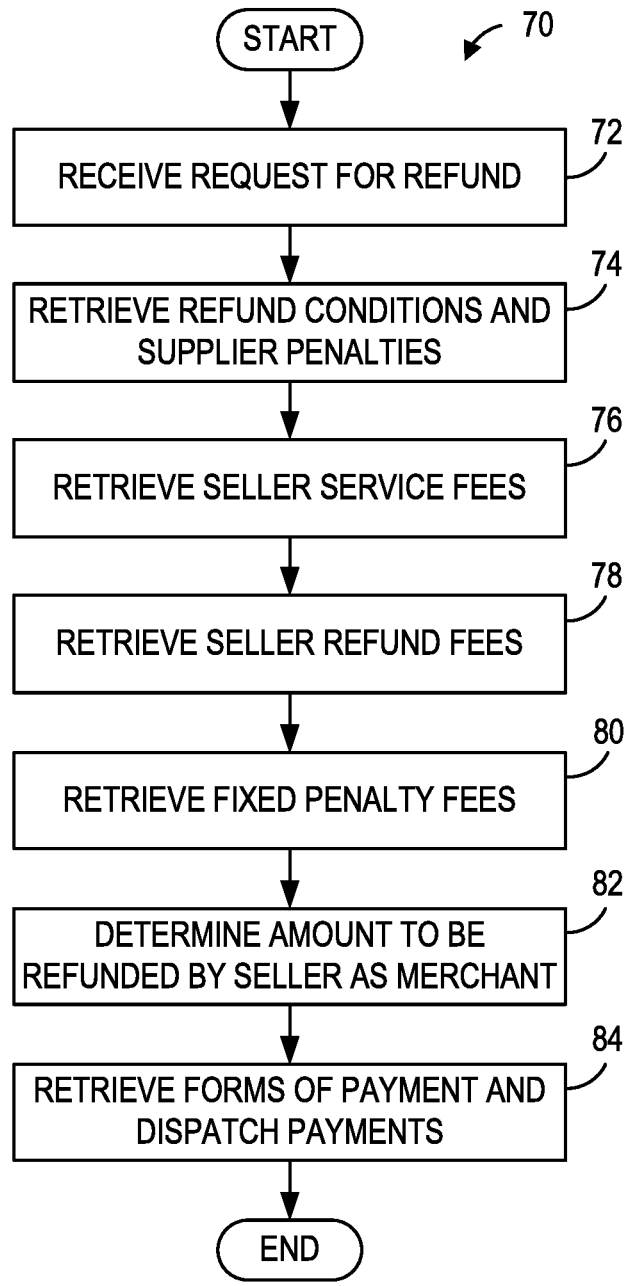
FIG. 4 is a flow chart of a payment determination process that may be implemented by the transaction server of FIG. 3.

FIG. 4 depicts a flowchart of a payment determination process 70 that may be implemented by the transaction server 60. In block 72, the process 70 may receive a request to refund all or part of a transaction. The refund request may include a list of the products for which a refund is desired, and may be received from the seller system 14. The seller system 14 may transmit the refund request in response to a system user (e.g., a travel or call center agent) initiating the refund on behalf of a buyer. The seller system 14 may also transmit the refund request in response to the buyer requesting the refund through a web-based interface, such as an online travel agency website. In either case, the seller system 14 may transmit the refund request to the transaction server 60 in the form of one or more Electronic Data Interchange For Administration, Commerce and Transport (EDIFACT), XML, or Web Service messages. These messages may be generated in response to the system user entering cryptic commands into a command line interface, or interacting with the seller system 14 through a Graphical User Interface (GUI).

In response to receiving the refund request, the process 70 may proceed to block 74 and retrieve refund conditions and supplier penalties for each product listed in the refund request. The refund conditions and supplier penalties may be retrieved in accordance with one or more business rules stored in the rules database 66. For example, the refund conditions and supplier penalties may be determined by querying the supplier system 16 (e.g., by requesting refund transaction and/or pricing conditions), based on rules stored in the transaction record at the time the products were booked, or based on rules stored in the rules database 66 for a given supplier.

Each supplier may publish a penalty fee $F_S$ for each product. These penalty fees may be applied during a refund transaction on a per-product basis, and may be subtracted from the amount that would otherwise be refunded to the seller in cases where the seller was the merchant for the sales transaction (i.e., the seller received payment for the product from the buyer) or the buyer in cases where the supplier was the merchant (i.e., the supplier received payment for the product from the buyer).

In block 76, the process 70 may retrieve any per-product seller service fees that apply on a per-product basis. A per-product service fee $F_P$ may be an amount charged by the seller to refund a particular product in the itinerary being refunded. The per-product service fee $F_P$ may be applied, for example, by the seller to cover costs of processing of the refund request. The per-product service fee $F_P$ may be charged in addition to any supplier penalty fees charged by the suppliers for refunding products. Criteria that may be used to determine per-product service fees may include the type of product (e.g., air, hotel, travel package), the sales date, refund date, the supplier, and/or the provider.

In block 78, the process 70 may retrieve any seller refund fees, which may be fees that apply at the transaction level. The seller refund fee $F_R$ may be a fee charged by the seller for processing the refund request that is not linked to a specific product. Criteria that may be used to determine seller refund fees may include the sales date and the refund date. For example, a refund fee may apply to a refund requested more than a certain number of days past the sales date. In an embodiment of the invention, the seller refund fee $F_R$ may include the per-product service fees $F_P$ that apply at the product level, in which case the seller refund fee $F_R$ may be a sum of the transaction level service fee and one or more product level service fees.

In block 80, the process 70 may retrieve any fixed penalty fees that the buyer was notified of at the time of the sale. A fixed penalty fee $F_F$ may define a penalty amount that the seller commits to for refunding a product regardless of what the actual supplier penalty fee $F_S$ is for the product at the time of refund. When a refund is requested, the fixed penalty fee $F_F$ may be applied to the buyer without regard to the supplier penalty fee $F_S$, which under a fixed penalty fee agreement may be the responsibility of the seller. At the time the buyer requests a refund, the actual supplier penalty fees applied by the suppliers can differ from the amount of the fixed penalty fees. If the sum of the supplier penalty fees applied by the suppliers differs from the sum of the fixed penalty fees, the seller may receive or pay the difference between the amounts. Criteria used to determine fixed penalty fees $F_F$ may include the type of product (air, hotel, package), the sales date, the identity of the supplier, and/or the identity of the provider. The rules identified by the criteria may provide seller conditions and the fixed penalty fee amount, which may be a fixed percentage of the total value of the sale.

In block 82, the process 70 may determine the amount to be refunded by the seller as merchant $R_{SM}$. In cases where a fixed penalty fee $F_F$ was not provided to the buyer, the supplier penalty fees $F_S$ may be applied without condition to the refund. The amount to be refunded to the buyer $R_{buyer}$ and the amount to be refunded by the seller $R_{seller}$ in this case may be determined using equations 1 and 2:

$$R_{buyer} = \sum_{i \in S_T} (P_i - F_{Si}) - F_R \qquad (\text{Eqn. 1})$$

$$R_{seller} = \sum_{i \in S_M} (P_i - F_{Si}) - F_R \qquad (\text{Eqn. 2})$$

Where $S_T$ is the set of all products being refunded (e.g., the itinerary), $S_M$ is the set of products being refunded for which the seller is the merchant, $P_i$ is the price paid for product i by the buyer, and $F_{Si}$ is the supplier penalty fee $F_S$ for product i. Where the merchant must be either the seller or the supplier for each product, the set of products for which the supplier is the merchant $S_S$ may be given by $(S_T - S_M)$.

In cases where a fixed penalty fee $F_F$ is provided at the time of sale, there may be comparison with the actual supplier penalty fee $F_S$ to determine whether the seller gained or lost money by having the fixed penalty fee $F_F$. The amount gained $G_i$ on each product i may be determined by equation 3:

$$G_i = F_{Fi} - F_{Si} \qquad \text{Eqn 3}$$

Keeping in mind that the gain $G_i$ can be negative (i.e., a loss) if the supplier penalty fee $F_{Si}$ exceeds the fixed penalty fee $F_{Fi}$ for the product i, the total gain G for the refund may be determined by equation 4:

$$G = \sum_{i \in S_T} (F_{Fi} - F_{Si}) \qquad \text{Eqn. 4}$$

The amounts of $R_{buyer}$ and $R_{Seller}$ under the fixed penalty scenario may be determined using equations 5 and 6 below:

$$R_{buyer} = \sum_{i \in S_T} P_i - \sum_{i \in S_T} (F_{Si} + G_i) - F_R \qquad \text{(Eqn. 5)}$$

$$R_{seller} = \sum_{i \in S_M} P_i - \sum_{i \in S_T} (F_{Si} + G_i) - F_R + \sum_{i \in S_P} F_{Si} \qquad \text{(Eqn. 6)}$$

In some cases, the process 70 may determine that a new payment is required from the buyer to the seller, i.e., if the value of $R_{Seller}$ is negative. This may occur, for instance, if the total amount of the refund penalties applied by the seller is greater than the sum of the prices of the products.

Once the amounts of $R_{seller}$ and G have been determined, the process 70 may proceed to block 84. In block 84, the process 70 may retrieve forms of payment and dispatch payments. The forms of payment may be retrieved from the payment system 20 based on information stored in travel record at the time contracts were issued for the products. Once the forms of payment have been determined, the process 70 may dispatch the amounts to be refunded using the forms of payment, roll back any issued contracts in ticketing systems and/or bookings in reservation systems, and provide a sales report confirming the refund to the payment system 20.

Figure 5:
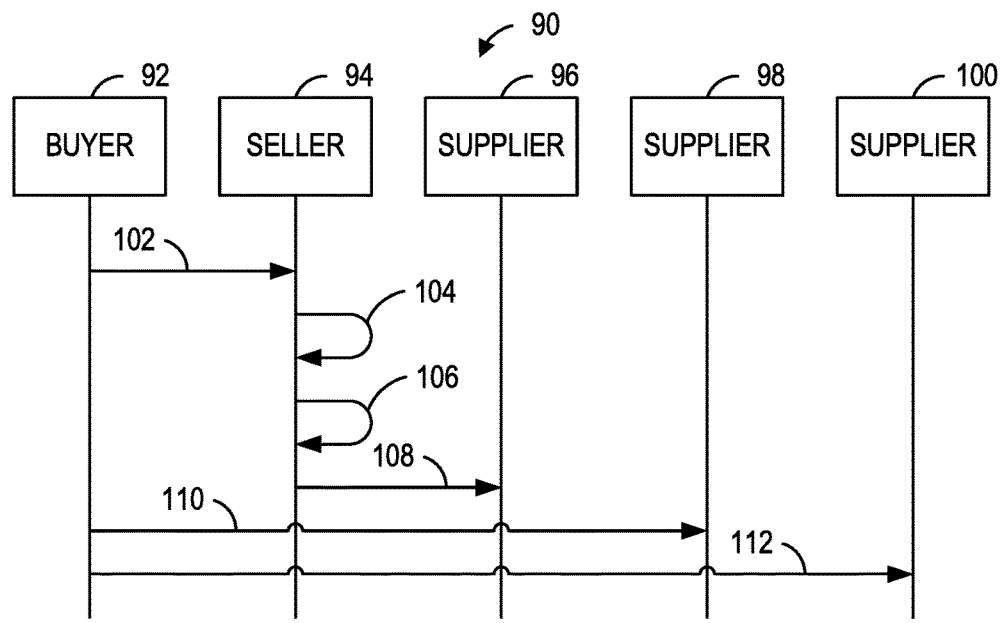
FIG. 5 is a diagrammatic view of payments that may be made between a buyer, a seller, and a plurality of suppliers which illustrates an example of the payment determination process of FIG. 4.

FIG. 5 depicts an exemplary financial flow 90 that may occur between a buyer 92, a seller 94 (e.g., a travel agency), and several suppliers 96, 98, 100. Supplier 96 may be a carrier selling a seat on a flight with the seller 94 as the merchant, supplier 98 may be another air carrier acting as the merchant for another seat on another flight, and supplier 100 may be a hotel acting as the merchant for a room.

To purchase the products, the buyer 92 may make a purchase payment 102 (e.g., $170) to the seller 94 to pay for the product supplied by supplier 96. Out of purchase payment 102, the seller may keep a mark-up 104 (e.g., $25) and a service fee 106 (e.g. $50). The seller may also make a purchase payment 108 to the supplier 96 equal to the remaining amount ($100) of purchase payment 102. The buyer 92 may make a purchase payment 110 (e.g., $100) to supplier 98 to pay for the product from supplier 98 with supplier 98 acting as the merchant. The buyer 92 may also make a purchase payment 112 (e.g., $200) to supplier 100 for the product from supplier 100 with supplier 100 acting as the merchant. The total amount paid for the itinerary by the buyer 92 may be the sum of purchase payments 102, 110, 112 to the seller 94 and suppliers 98, 100, or in this exemplary case:

$$P_{buyer} = \sum_{i \in S_T} P_i = \$170 + \$100 + \$200 = \$470 \qquad \text{(Eqn. 7)}$$

Figure 6:
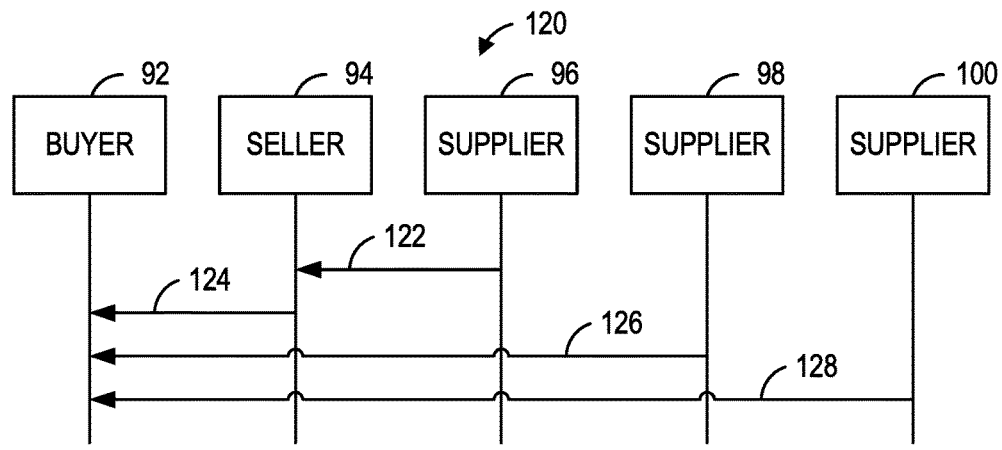
FIG. 6 is a diagrammatic view of payments that may be made between the buyer, the seller, and the plurality of suppliers which illustrates another example of the payment determination process of FIG. 4.

FIG. 6 depicts an exemplary financial flow 120 that may occur between the buyer 92, the seller 94, and the suppliers 96, 98, 100 for a refund in which the seller is permitted to add a seller refund fee $F_R$. The supplier 96 may make a refund payment 122 (e.g., $70) to the seller 94 equal to the amount of purchase payment 108 (e.g., $100) minus the supplier penalty fee $F_S$ (e.g., $30) applied by supplier 96. The seller 94 may apply the seller refund fee $F_R$ (e.g., $20), and make a refund payment 124 for the remaining amount (e.g., $50) to the buyer 92. The suppliers that were merchants 98, 100 may make refund payments 126, 128 to the buyer 92. The amount of refund payment 126 (e.g., $80) may be equal to the amount of purchase payment 110 (e.g., $100) minus the supplier penalty fee $F_S$ (e.g., $20). In contrast, if supplier 100 does not charge a cancellation penalty fee, the amount of refund payment 128 (e.g., $200) may be equal to the amount of purchase payment 112 (e.g., $200). Assuming the service fee 106 (e.g., $50) is not refundable, and using the exemplary values from the above example, the buyer 92 would receive a total refund:

$$R_{buyer} = \$50 + \$80 + \$200 = \$330$$

In some cases, product packages may be sold with after-sales conditions defined by the seller 94 that are independent of supplier penalty fee $F_S$. For example, if a refund policy for the products depicted in FIG. 6 includes a fixed penalty fee $F_F$ equal to 15% of the total amount paid by the buyer excluding service fee 106, the fixed penalty fee $F_F$ using the values in the above example would be:

$$F_F = 0.15 \times (\$470 - \$50) = \$63$$

In this scenario, this amount would be amount of the fixed fee $F_F$ charged to the buyer 92 by the seller 94 regardless of the amount of the supplier penalty fees $F_{Si}$.

Using the same exemplary monetary values as before, supplier 96 makes the refund payment 122 (e.g., $70) to the seller 94, and suppliers 98, 100 make refund payments 126, 128 (e.g., $80, $200) to the buyer 92. Because the amount of the total refund to the buyer $R_{buyer}$ equals $P_{buyer} - F_R - F_F$, the amount of $R_{buyer}$ in this example should be $470-$50-$63=$357. Because the buyer 92 receives a total of $280 from the sellers 98, 100, the amount of refund payment 124 in this example should be $357-$280, or $77.

Figure 7:
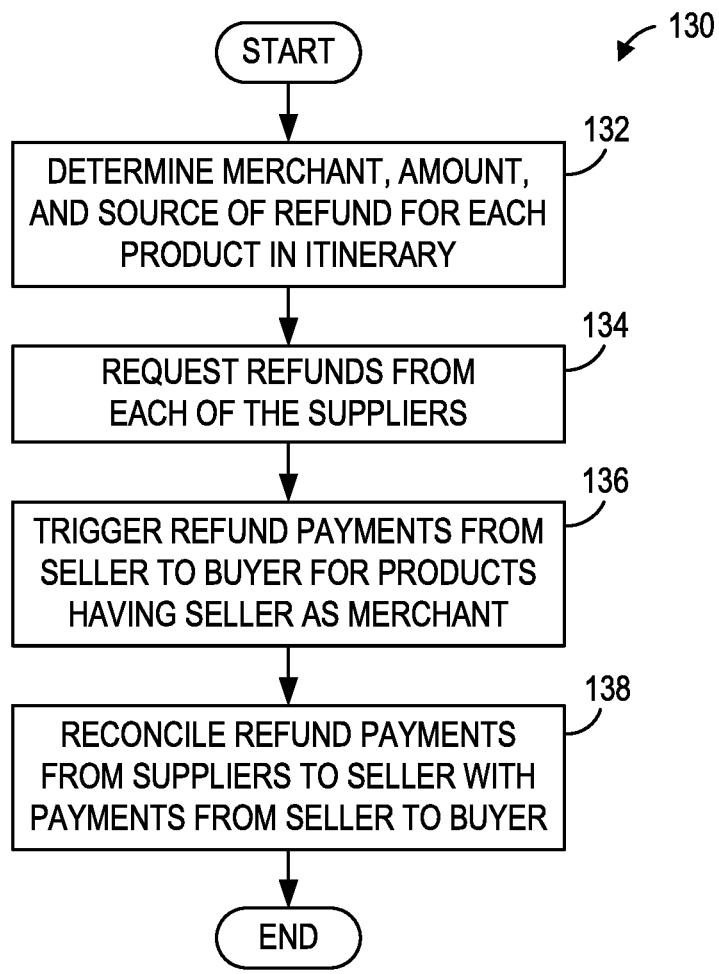
FIG. 7 is a flow chart of a refund process that may be implemented by the transaction server of FIG. 3.

FIG. 7 depicts a flowchart of a refund process 130 that may be implemented by the transaction server 60 to orchestrate a refund of an itinerary. In block 132, the process may determine the identity of the merchant, the amount, and the source of the refund payment for each product in the itinerary as described above. Once the identities of the merchants, the amounts, and the sources of the refund payments have been determined in block 132, the process 130 may proceed to block 134 and transmit refund requests to suppliers of products in the itinerary. In an embodiment of the invention, the process 130 may only transmit refund requests to suppliers for which the seller is the merchant. For this embodiment, refunds from the supplier side may be handled by the transaction server 60 (e.g., for products in which the seller is the merchant) or delegated to an external provider (e.g., for products in which the supplier is the merchant).

In response to receiving refund payments from each supplier of a product in the itinerary having the seller as merchant, and receiving confirmation that the respective products have been cancelled by the suppliers, the process 130 may proceed to block 136. In block 136, the process 130 may trigger refund payments from the seller to the buyer for the products having the seller as the merchant. The process 130 may trigger the refund payments by transmitting refund requests to the payment system 20, which may cause payments to be made from an account of the seller to a form of payment used by the buyer to purchase the products in question. In response to receiving refund payments from each of the suppliers, the process 130 may proceed to block 138.

In block 138, the process 130 may reconcile refund payment received from the suppliers with refund payments made to the buyer. To this end, the process 130 may create a Refund Financial Item (RFI) in the transaction database 64 that stores refund details calculated and/or retrieved at the time the refund request was received. Each RFI may be associated with a seller form of payment, which may be the form of payment used to settle seller accounts. The seller form of payment may be defined in the travel record, and may define the amount of the payment and the method of payment on which the refund is to be made.

Figure 8:
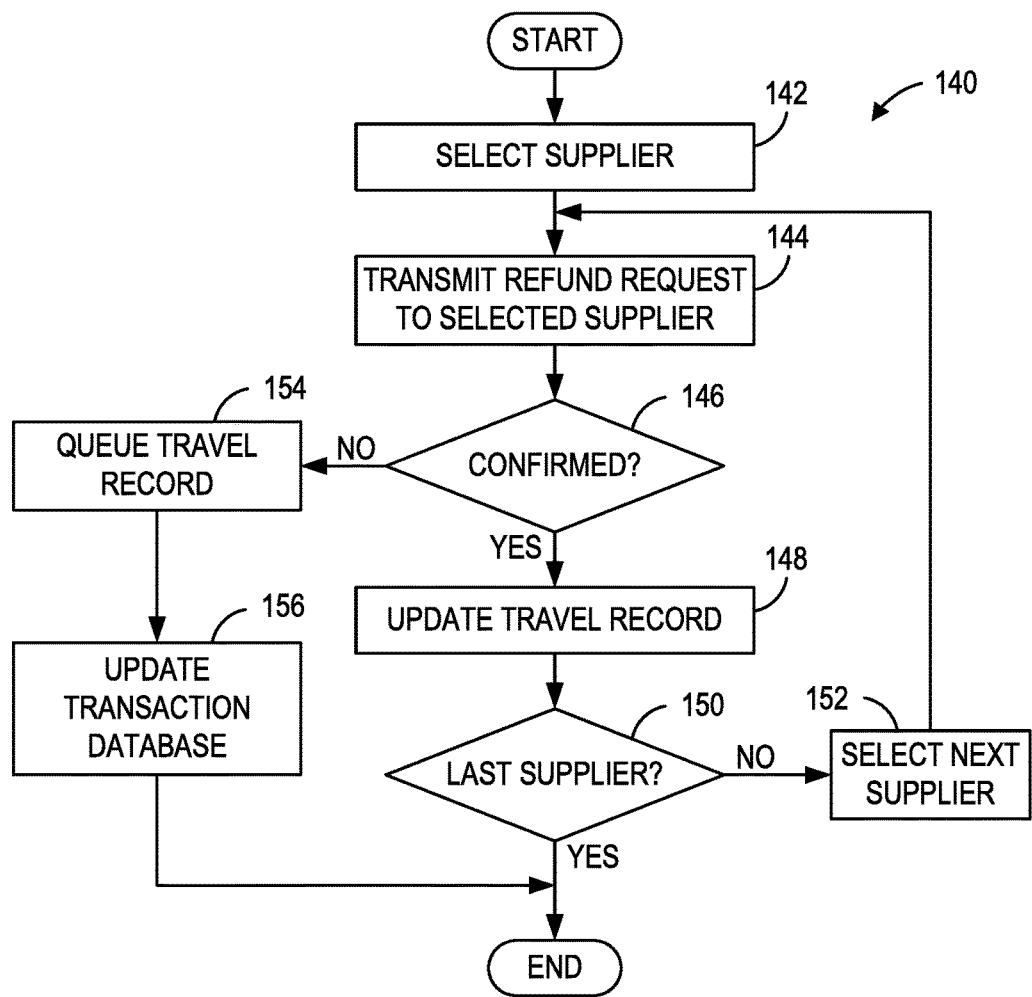
FIG. 8 is a flow chart of a refund sub-process that may be implemented by the refund process of FIG. 7.

FIG. 8 depicts a flowchart of a refund sub-process 140 that may be implemented by the transaction server 60 to process refund payments from the suppliers to the seller. In block 142, the sub-process 140 may select a supplier from which to request a refund. The supplier may be selected from a list of suppliers of products in the inventory for which the seller was the merchant. Once the supplier has been selected, the sub-process 140 may proceed to block 144.

In block 144, the sub-process 140 may transmit a refund request to the selected supplier. In response, the supplier system 16a-16n may process the refund request by triggering a refund payment to the seller, and cancelling any reservations or issued contracts for the product in question. If the process receives confirmation that the refund request has been processed ("YES" branch of decision block 146), the sub-process 140 may proceed to block 148 and update the travel record to reflect that the product has been refunded. This updating may include, for example, changing a status of the product in the travel record from reserved or ticketed to cancelled or refunded.

If the supplier is the last supplier in the itinerary that needs to be processed ("YES" branch of decision block 150), the sub-process 140 may end. If there are additional suppliers from which a refund is needed ("NO" branch of decision block 152), the sub-process 140 may proceed to block 152, select the next supplier, and return to block 144.

In some cases, the sub-process 140 may encounter an error, in which case the refund process may be halted. For example, if the supplier system 16a-16n fails to confirm successful processing of the refund request ("NO" branch of decision block 146), the sub-process 140 may proceed to block 154. In block 154, the process 140 may queue the travel record corresponding to the itinerary including the product being refunded. Queuing the travel record may cause a notification to be sent to the seller system 14 indicating that the process 130 has encountered an error and needs attention. The error may then be corrected by a call center agent, for example, who may update the travel record accordingly.

In block 156, the sub-process 140 may update or create a record in the transaction database 64. This record may store transaction data that defines the status of the transaction. For example, the transaction data may indicate which products in the corresponding travel record have been refunded, which products still need to be refunded, and the product that triggered the error. Once the travel record has been queued and the transaction database updated, the sub-process 140 may end.

In order to facilitate correction of an error, the seller system 14 may query the transaction database 64 for the corresponding transaction record, and display information to the agent informing the agent of why the refund request failed. In an embodiment of the invention, the transaction server 60 may include a web portal that provides a user interface for accessing the transaction database 64.

The agent may retrieve the transaction record for the itinerary, determine status of the refund request that caused the error, correct the error, and update the travel record. In response to receiving a request for the status of the transaction, the web portal may return a list of products that are part of the transaction, the products already refunded, the product or step on which the last refund request failed (if applicable), and any error messages returned by the systems involved in the refund request. This information may allow the agent to either correct missing and/or corrupted data that caused transaction to fail, or trigger a refund manually for that product. The agent may also flag a product in the transaction record so that the transaction server skips the refund request for the flagged product. Flagging a product for which a refund has failed may allow the refund process to continue for any remaining products in the itinerary. In cases where the refund is triggered manually, the agent may flag the product as being refunded in the transaction record and/or travel record. Once the agent has corrected or bypassed the cause of the error, the agent may cause the seller system 14 to send a restart request to the transaction server 60 requesting the transaction server 60 continue the refund process from where the process was stopped.

Figure 9:
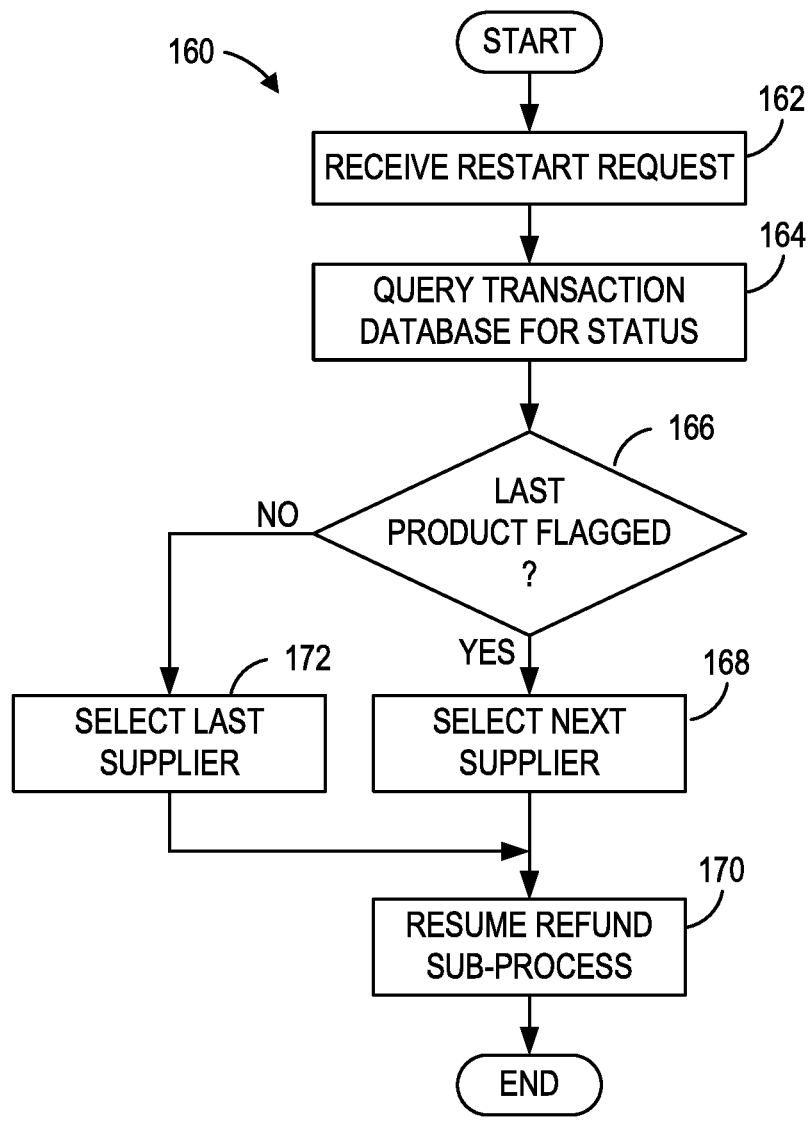
FIG. 9 is a flow chart of a restart process that may be implemented by the transaction server of FIG. 3.

FIG. 9 depicts a flowchart of a restart process 160 that may be implemented by the transaction server 60 to restart a refund process that was halted due to an error. In response to receiving the restart request in block 162, the process 160 may proceed to block 164 and query the transaction database 64 for the status of the transaction. In response to receiving the query, the transaction database 64 may locate the transaction record corresponding to the transaction in question, and return data indicating the status of the transaction.

In block 166, the process 160 may determine if the last product that caused the error is flagged as having been refunded, or flagged as to be skipped. If the product is so flagged ("YES" branch of decision block 166), the process 160 may proceed to block 168 and select the next supplier in the list of list of suppliers of products for which the seller is the merchant. The process 160 may then proceed to block 170 and resume the refund process, as described above with respect to FIG. 8. If the last product is not flagged ("NO" branch of decision block 166), the process 160 may proceed to block 172, select the last product, and proceed to block 170.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An online transaction processing system comprising:
one or more processors; and
a memory in communication with the one or more processors, the memory storing program code configured to, when executed by the one or more processors, cause the system to:
receive a refund request identifying a first database record that defines an itinerary, a first product in the itinerary to be refunded, and a second product in the itinerary to be refunded, the refund request initiating a refund process;
retrieve, from the first database record, first data defining a first merchant for the first product as a supplier of the first product, a first payment made by a buyer for the first product, a seller as a second merchant for the second product, and a second payment made by the buyer for the second product;

determine, based on the first data, a first amount to be refunded to the buyer from the seller, a second amount to be refunded to the buyer from the supplier of the first product, and a third amount to be refunded to the seller from the supplier for the second product;

identify, by the one or more processors, an error condition prior to completing the refund process;

in response to identifying the error condition, halt the refund process and store refund status information related to the itinerary in a second database record;

restart the refund process and query the second database record storing refund status information related to the itinerary in response to receiving a restart request; and skip processing a subset of the refund request concerning a flagged product based on evaluation of the refund status information stored in the second record upon restarting the processing of the refund request.

2. The system of claim 1 wherein the program code is further configured to cause the system to:

retrieve one or more first rules that define a first condition which must be met for the supplier of the first product to refund the first product;

retrieve one or more second rules that define a second condition which must be met for the supplier of the second product to refund the second product; and retrieve one or more third rules that define a third condition which must be met for the seller to process the refund request, wherein the first amount, the second amount, and the third amount are further determined based on the one or more first rules, the one or more second rules, and the one or more third rules.

3. The system of claim 2 wherein the program code causes the system to retrieve the one or more third rules by:

for each of the first and second products, retrieving one or more fourth rules that define a first fee charged by the seller to refund the first product or the second product for which the one or more fourth rules are being retrieved; and retrieving one or more fifth rules that define a second fee charged by the seller for processing of the refund request, wherein the one or more third rules comprise the one or more fourth rules and the one or more fifth rules.

4. The system of claim 2 wherein:

the first condition comprises at least one of a first fee that is charged by the supplier of the first product or one of the one or more first rules enforced by the supplier of the first product, and the second condition comprises at least one of a second fee that is charged by the supplier of the second product or one of the one or more second rules enforced by the supplier of the second product.

5. The system of claim 1 wherein the program code causes the system to orchestrate a refund by:

causing the first amount to be transferred from the seller to the buyer;

causing the second amount to be transferred from the supplier of the first product to the buyer; and causing the third amount to be transferred from the supplier of the second product to the seller.

6. The system of claim 5 wherein the program code is further configured to cause the system to:

retrieve second data from a second database record, the second data defining one or more first forms of payment used to make the first payment and one or more second forms of payment used to make the second payment, wherein one or more accounts of the buyer into which the first amount and the second amount are transferred is determined based at least in part on the one or more first forms of payment and the one or more second forms of payment.

7. The system of claim 5 wherein the program code is further configured to cause the system to:

in response to determining an error has occurred, store second data in a second database record, the second data defining a status of the refund request;

queue the first database record; and suspend processing of the refund request.

8. The system of claim 7 wherein the second data defines the status of the processing of the refund request by identifying at least one of the first product, the second product, a refund status of each product, the product or process that triggered the error, or a type of error.

9. The system of claim 7 wherein the program code is further configured to cause the system to:

in response to receiving a restart request, retrieve the second data from the second database record;

execute a command provided by the restart request, the command instructing the system to correct or bypass a cause of the error; and restart the processing of the refund request based on the second data.

10. The system of claim 1, wherein the program code is further configured to cause the system to:

receive a cancellation confirmation concerning the second product from a respective supplier and a notification that the seller received a first refund payment from the respective supplier for the second product; and trigger a second refund payment from the seller for the second product in response to receiving the cancellation confirmation and the notification.

11. A method of processing an online transaction, the method comprising:

receiving a refund request at an online transaction processing system, the refund request identifying a first database record that defines an itinerary, a first product in the itinerary to be refunded, and a second product in the itinerary to be refunded, the refund request initiating a refund process;

retrieving, by the online transaction processing system from the first database record, first data defining a first merchant for the first product as a supplier of the first product, a first payment made by a buyer for the first product, a seller as a second merchant for the second product, and a second payment made by the buyer for the second product;

determining, by the online transaction processing system based on the first data, a first amount to be refunded to the buyer from the seller, a second amount to be refunded to the buyer from the supplier of the first product, and a third amount to be refunded to the seller from the supplier for the second product;

identifying, by the online transaction processing system, an error condition prior to completing the refund process;

in response to identifying the error condition, halting the refund process and storing refund status information related to the itinerary in a second database record;

restarting the refund process and querying the second database record storing refund status information related to the itinerary in response to receiving a restart request; and skip processing a subset of the refund request concerning a flagged product based on evaluation of the refund status information stored in the second record upon restarting the processing of the refund request.

12. The method of claim 11 further comprising:

retrieving one or more first rules that define a first condition which must be met for the supplier of the first product to refund the first product;

retrieving one or more second rules that define a second condition which must be met for the supplier of the second product to refund the second product; and retrieving one or more third rules that define a third condition which must be met for the seller to process the refund request, wherein the first amount, the second amount, and the third amount are further determined based on the one or more first rules, the one or more second rules, and the one or more third rules.

13. The method of claim 12 wherein retrieving the one or more third rules comprises:

for each of the first and second products, retrieving one or more fourth rules that define a first fee charged by the seller to refund the first product or the second product for which the one or more fourth rules are being retrieved; and retrieving one or more fifth rules that define a second fee charged by the seller for processing of the refund request, wherein the one or more third rules comprise the one or more fourth rules and the one or more fifth rules.

14. The method of claim 12 wherein:

the first condition comprises at least one of a first fee that is charged by the supplier of the first product or one of the one or more first rules enforced by the supplier of the first product, and the second condition comprises at least one of a second fee that is charged by the supplier of the second product or one of the one or more second rules enforced by the supplier of the second product.

15. The method of claim 11 further comprising orchestrating a refund by:

causing the first amount to be transferred from the seller to the buyer;

causing the second amount to be transferred from the supplier of the first product to the buyer; and causing the third amount to be transferred from the supplier of the second product to the seller.

16. The method of claim 15 further comprising:

retrieving second data from a second database record, the second data defining one or more first forms of payment used to make the first payment and one or more second forms of payment used to make the second payment, wherein one or more accounts of the buyer into which the first amount and the second amount are transferred is determined based at least in part on the one or more first forms of payment and the one or more second forms of payment.

17. The method of claim 15 further comprising:

in response to determining an error has occurred, storing second data in a second database record, the second data defining a status of the refund request;

queuing the first database record; and suspending processing of the refund request.

18. The method of claim 17 wherein the second data defines the status of the processing of the refund request by identifying at least one of the first product, the second product, a refund status of each product, the product or process that triggered the error, or a type of error.

19. The method of claim 17 further comprising:

in response to receiving a restart request, retrieving the second data from the second database record;

executing a command provided by the restart request to correct or bypass a cause of the error; and restarting the processing of the refund request based on the second data.

20. The method of claim 19 wherein the cause of the error is a failure by the supplier of the first product or the second product to respond to a transfer request to transfer the second amount to the buyer or the third amount to the seller, and executing the command to correct or bypass the cause of the error comprises:

skipping the processing of a portion of the refund related to the supplier that failed to respond to the transfer request.

21. A computer program product comprising:

a non-transitory computer-readable storage medium; and program code stored on the non-transitory computer-readable storage medium that, when executed by one or more processors, causes the one or more processors to:

receive a refund request identifying a first database record that defines an itinerary, a first product in the itinerary to be refunded, and a second product in the itinerary to be refunded, the refund request initiating a refund process;

retrieve, from the first database record, data defining a first merchant for the first product as a supplier of the first product, a first payment made by a buyer for the first product, a seller as a second merchant for the second product, and a second payment made by the buyer for the second product;

determine, based on the data, a first amount to be refunded to the buyer from the seller, a second amount to be refunded to the buyer from the supplier of the first product, and a third amount to be refunded to the seller from the supplier for the second product;

identify, by the one or more processors, an error condition prior to completing the refund process;

in response to identifying the error condition, halt the refund process and store refund status information related to the itinerary in a second database record;

restart the refund process and query the second database record storing refund status information related to the itinerary in response to receiving a restart request; and skip processing a subset of the refund request concerning a flagged product based on evaluation of the refund status information stored in the second record upon restarting the processing of the refund request.

* * * * *